United States Patent
Serizawa et al.

(10) Patent No.: US 9,436,004 B2
(45) Date of Patent: Sep. 6, 2016

(54) OPTICAL SCANNING DEVICE AND IMAGE FORMING APPARATUS

(71) Applicants: Keiichi Serizawa, Kanagawa (JP);
Hiroshi Johno, Kanagawa (JP);
Daisuke Yoshida, Kanagawa (JP);
Kazunori Watanabe, Tokyo (JP)

(72) Inventors: Keiichi Serizawa, Kanagawa (JP);
Hiroshi Johno, Kanagawa (JP);
Daisuke Yoshida, Kanagawa (JP);
Kazunori Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 14/081,131

(22) Filed: Nov. 15, 2013

(65) Prior Publication Data

US 2014/0146375 A1    May 29, 2014

(30) Foreign Application Priority Data

Nov. 27, 2012   (JP) ................................. 2012-258693

(51) Int. Cl.
*G02B 26/12* (2006.01)

(52) U.S. Cl.
CPC .................................. *G02B 26/125* (2013.01)

(58) Field of Classification Search
None
See application file for complete search history.

(56) References Cited

U.S. PATENT DOCUMENTS

| 2006/0132880 A1* | 6/2006 | Amada | G02B 7/02 |
| | | | 359/221.2 |
| 2009/0153934 A1* | 6/2009 | Shoji | G02B 7/182 |
| | | | 359/205.1 |

FOREIGN PATENT DOCUMENTS

JP    4951242    3/2012

* cited by examiner

*Primary Examiner* — Jennifer L. Doak
(74) *Attorney, Agent, or Firm* — Harness, Dickey & Pierce, P.L.C

(57) ABSTRACT

An optical scanning device includes an optical housing; an elongated optical element arranged in the optical housing and having a shape extending in a main-scanning direction; a retaining member provided at a side opposite to a surface of the optical housing on which the optical element is arranged to maintain an attachment attitude of the optical element in the optical housing; a curvature adjusting unit configured to adjust a curvature of the elongated optical element in a scanning line via the retaining member; a tilt adjusting unit configured to adjust a tilt of the optical element in the scanning line by making the optical element rotate on an optical axis via the retaining member; and a positioning unit configured to position the optical element in the optical axis direction, and provided in the optical housing and having such a shape that the optical element fits the positioning unit.

5 Claims, 8 Drawing Sheets

OPTICAL SCANNING DEVICE AND IMAGE FORMING APPARATUS

CROSS-REFERENCE TO RELATED APPLICATION

The present application claims priority to and incorporates by reference the entire contents of Japanese Patent Application No. 2012-258693 filed in Japan on Nov. 27, 2012.

BACKGROUND OF THE INVENTION

1. Field of the Invention

The present invention relates to an optical scanning device and an image forming apparatus.

2. Description of the Related Art

An optical scanning device in a color image forming apparatus has a problem that a curvature and a tilt occur in a laser scanning line in forming an electrostatic latent image on a photosensitive element as an image carrier.

The problem is caused by characteristics of a field curvature of an optical element, a distortion of an optical housing, a thermal deformation due to a heat generation of a polygon motor, a thermal deformation due to a heat generation of units generating heat such as a fixing unit in a main body of an image forming apparatus, and a distortion of a photosensitive element in installation.

The occurrence of the curvature and the tilt in a scanning line causes a color deviation since three or four scanning lines do not overlap in a color image forming apparatus.

To deal with the problem, known is a technique for adjusting, while keeping a state where curvature of a scanning line is adjusted, an amount of tilt, occurring due to a thermal change in an image forming apparatus, of a scanning line as disclosed in Japanese Patent No. 4951242.

As illustrated in FIG. 3 in the adjustment technique disclosed in Japanese Patent No. 4951242, a deflection amount (Z direction) of an elongated lens as an optical element is controlled by a scanning line curvature adjusting unit which is attached to a bracket serving as a retaining member.

A tilt amount can be adjusted by a rotation on an axis of an X direction, by a driving motor of a tilt adjusting unit, of the elongated lens while the adjusted deflection amount is maintained.

From a standpoint of a desired precision in lens attachment, it is necessary to cause the elongated lens to be in direct contact with a positioning unit provided in the optical housing with respected to the X direction (optical axis direction).

For the positioning, both end parts of the elongated lens are pressed to the X direction by a plate spring 102 which is fixed to an optical housing 100 to cause the elongated lens 5 to be in direct contact with a positioning unit 104 formed in the optical housing, as illustrated in FIG. 19.

A direct contacting part 5-3 projecting outward from the both end parts of the elongated lens 5 comes to have a direct contact with the positioning unit 104 by a biasing force (pressure force) of the plate spring 102 and the elongated lens 5 is thus positioned in the optical axis direction.

The both end parts of the elongated lens 5 are retained in a bracket 21 by plate springs 23 and 24.

As explained above, it is necessary to perform a rotating operation on an axis, as a rotation center, of the X direction in adjusting a tilt amount of the elongated lens.

In this case, a pressure force F1 by the plate spring 102 intersects with a rotation force F2 and serves to prevent the rotation force F2.

The pressure force by the plate spring 102 also serves to prevent a displacement in position of the elongated lens due to an impact, a vibration, and the like toward the optical axis direction in the course of distribution and the like.

Therefore, while being required to be sufficiently large, the pressure force by the plate spring 102 becomes a factor of generating a frictional force between the elongated lens and the positioning unit in the optical axis direction of the optical housing and hence disturbs the rotating operation in adjusting the tilt.

To perform the tilt adjusting operation satisfactorily in this contradictory force relationship, a design of a plate spring to be mounted becomes highly delicate and thereby a tolerance needs to be set strictly, which results in the plate spring with higher cost than a normal plate spring.

Besides, there are some cases where all components are not necessarily as good as designed in mass production and the pressurizing system by plate springs does not have a robust structure against disturbance from a stand point of robustness in regard to part variation.

Low robustness means no room for adjustments in range and precision in the structure.

Therefore, there is a need for an optical scanning device capable of securing enough room for adjustment in range in adjustment of curvature of a scanning line, suppressing variation in adjustment precision, and contributing to a reduction in cost as a result of a reduction in the number of components to be mounted.

SUMMARY OF THE INVENTION

It is an object of the present invention to at least partially solve the problem in the conventional technology.

According to an embodiment, there is provided an optical scanning device that includes an optical housing; an elongated optical element arranged in the optical housing, the elongated optical element having a shape extending in a main-scanning direction; a retaining member provided at a side opposite to a surface of the optical housing on which the elongated optical element is arranged, the retaining member being configured to maintain an attachment attitude of the elongated optical element in the optical housing; a scanning line curvature adjusting unit configured to adjust a curvature of the elongated optical element in a scanning line via the retaining member; a scanning line tilt adjusting unit configured to adjust a tilt of the elongated optical element in the scanning line by making the elongated optical element rotate on an axis of an optical axis direction via the retaining member; and an optical axis direction positioning unit configured to position the elongated optical element in the optical axis direction, the optical axis direction positioning unit being provided in the optical housing and having such a shape that the elongated optical element fits the optical axis direction positioning unit.

According to another embodiment, there is provided an optical scanning device that includes an optical housing; an elongated optical element arranged in the optical housing, the elongated optical element having a shape extending in a main-scanning direction; a retaining member provided at a side opposite to a surface of the optical housing on which the elongated optical element is arranged, the retaining member being configured to maintain an attachment attitude of the elongated optical element in the optical housing; a scanning line curvature adjusting unit configured to adjust a curvature of the elongated optical element in a scanning line via the retaining member; a scanning line tilt adjusting unit configured to adjust a tilt of the elongated optical element in the scanning line by making the elongated optical element rotate on an axis of an optical axis direction via the retaining member; and an optical axis direction positioning unit configured to position the elongated optical element in the optical axis direction. The optical axis direction positioning unit includes first receiving parts for regulating respective end parts of the elongated optical element in the main-scanning direction at a same side in the optical axis direction, but not regulating the respective end parts in the main-scanning direction at an opposite side in the optical axis direction, and a second receiving part for regulating a center part of the elongated optical element in the main-scanning direction at the opposite side in the optical axis direction, but not regulating the center of the elongated optical element in the main-scanning direction at the same side in the optical axis.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings.

First Embodiment

A first embodiment will be explained with reference to FIGS. 1 to 16.

Figure 1:
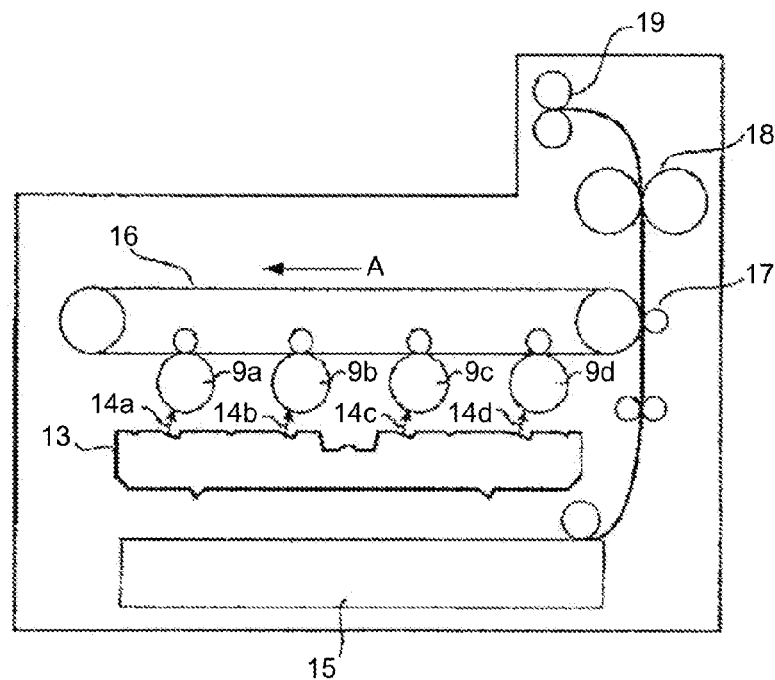
FIG. 1 is a brief overview of a configuration of a digital color printer as an image forming apparatus according to a first embodiment of the present invention.

First, a brief overview of a configuration of a digital color printer as an image forming apparatus according to the present embodiment will be explained with reference to FIG. 1.

At a center part of a main body of an image forming apparatus, photosensitive drums 9a, 9b, 9c, and 9d each as an image carrier are arranged at intervals in the horizontal direction.

Around the photosensitive drums 9a, 9b, 9c, and 9d, known units that forms a toner image of yellow, magenta, cyan, and black (in no particular color order) are arranged.

In each of the photosensitive drums 9a, 9b, 9c, and 9d, an electrostatic latent image is formed by an optical scanning device 13 and visualized as a toner image by a developing unit.

Each toner image is transferred by being overlaid on an intermediate transfer belt 16 as an intermediate transfer body arranged at an upper part of the photosensitive drums. A reference symbol A denotes a moving direction of the intermediate transfer belt 16.

A paper feed tray 15 as a feeding unit is arranged at a lower part of the main body of the image forming apparatus.

A sheet of paper, as a recording medium, separated from the other sheets of paper and fed from the paper feed tray 15 is conveyed to a secondary transfer part at a predetermined timing and the toner image on the intermediate transfer belt 16 is transferred by a secondary transfer roller 17 as a secondary transfer unit.

The sheet of paper on which the image is transferred and the toner image is fixed by a fixing unit 18 is discharged to an upper surface, as a discharge tray, of the main body of the image forming apparatus by a pair of discharging rollers 19.

Figure 2:
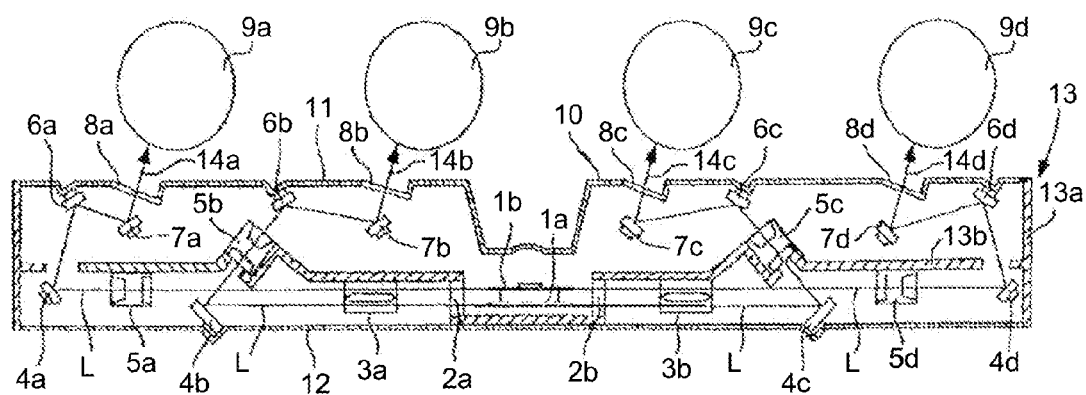
FIG. 2 is a schematic cross sectional view in a sub-scanning direction of an optical scanning device.

FIG. 2 is a schematic cross sectional view in a sub-scanning direction of the optical scanning device 13.

In FIG. 2, reference symbols 1a and 1b denote a polygon mirror which has reflecting mirrors on side surfaces in a regular polygon, and polarizes and scans with a laser beam by a high speed rotation.

Around the polygon mirror, soundproof glasses 2a and 2b that exerts an effect of deadening a sound of a motor driving the rotation of the polygon mirror are arranged.

Reference symbols 3a and 3b denote fθ lenses that change a conformal motion of a beam scanning into a uniform linear motion by the polygon mirror.

The laser beam is guided to photosensitive drums by first to third mirrors (4a, 4b, 4c, 4d, 6a, 6b, 6c, 6d, 7a, 7b, 7c, and 7d).

Reference symbols 5a, 5b, 5c, and 5d denote elongated lenses (toroidal lenses) each as an elongated optical element that corrects an optical face tangle error in the polygon mirror.

An optical housing 50 includes a side wall 13a, an optical element arranging surface 13b, an upper lid 11 that seals the optical housing, a lower lid 12, a polygon mirror lid 10, and the like.

Dustproof glasses 8a, 8b, 8c, and 8d prevent dust and the like from dropping in an inside of the optical housing.

Reference symbols 14a, 14b, 14c, and 14d denote respective optical paths to the photosensitive drums.

Figure 3:
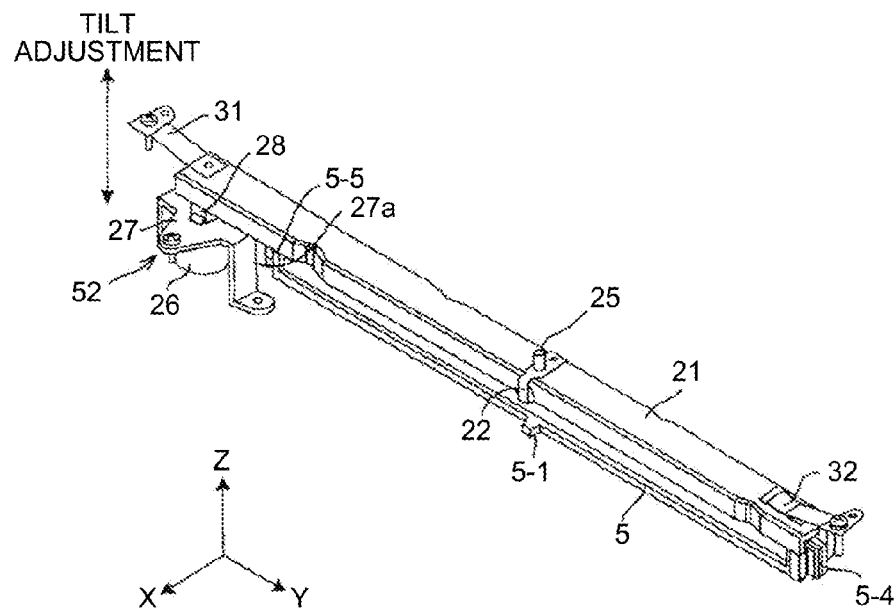
FIG. 3 is a perspective view, seen from an outgoing surface side, of a lens unit in which an elongated lens and a bracket are assembled.
Figure 4:
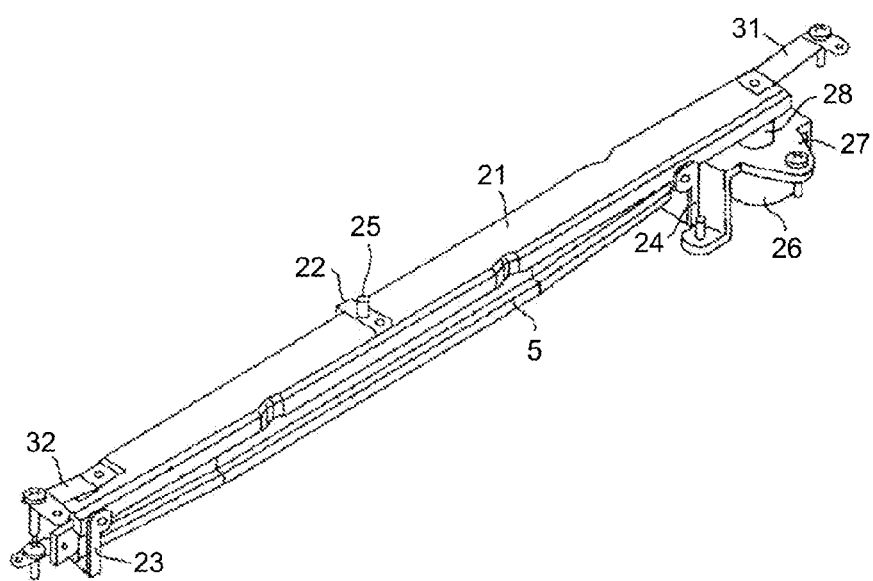
FIG. 4 is a perspective view seen from an incoming surface side of the lens unit.

As illustrated in FIGS. 3 and 4, the elongated lens 5 is retained in a bracket 21 as a retaining member that maintains an attachment attitude in the optical housing.

The bracket 21 is provided at an opposite side of the optical element arranging surface 13b which is a surface of the optical housing on which the elongated lens 5 is arranged.

The elongated lens 5 is fixed by a plate spring 22 at a center part in a main-scanning direction (Y direction) and by plate springs 23 and 24 at both end parts with respect to the bracket 21.

An upper surface side at the both end parts of the bracket 21 is depressed by plate springs 31 and 32 each as a depressing member and the elongated lens 5 is positioned in the Z direction perpendicular to the optical axis direction (X direction) thereof.

At a center part in the main-scanning direction of the bracket 21, an adjustment spring 25 as a scanning line curvature adjusting unit that adjusts a curvature of a scanning line is provided.

At one end side in the main-scanning direction of the bracket 21, a scanning line tilt adjusting unit 52 that adjusts a tilt of a scanning line is provided.

The scanning line tilt adjusting unit 52 includes a driving motor 26, a motor holder 27 that fixes the driving motor 26 to the optical housing, and an adjuster 28. The motor holder 27 is fixed to the optical housing by a leg part 27a having an L shape.

A scanning line tilt is adjusted under the biasing force by the plate springs 31 and 32.

A lubricating member, not illustrated, is provided between the upper surface of the bracket 21 and the plate springs 31 and 32.

In a lower end part at the center part in the main-scanning direction of the elongated lens 5, a convex part 5-1 that performs a positioning in the Y direction is formed.

Figure 5:
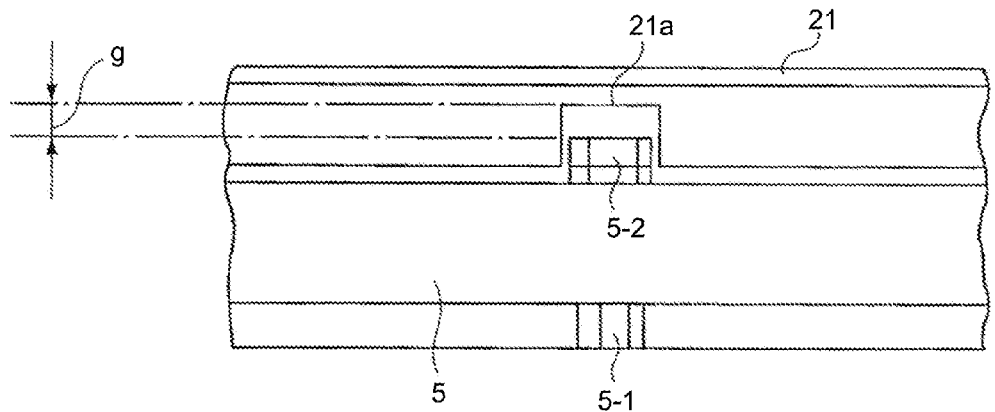
FIG. 5 is a front view of a relevant part of the lens unit seen from the outgoing surface side.

As illustrated in FIG. 5, a convex part 5-2 is formed in an upper end part at the center part in the main-scanning direction of the elongated lens 5 and a concave part 21a, corresponding to the convex part 5-2, is formed in the bracket 21.

A gap g is provided between the center part of the elongated lens 5 and the center part of the bracket 21.

Figure 6:
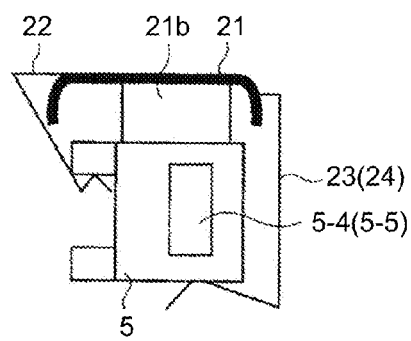
FIG. 6 is a side view of the lens unit.
Figure 7:
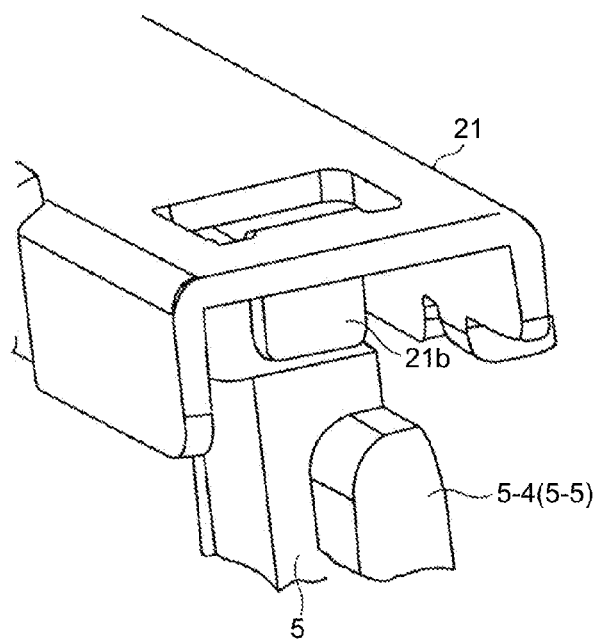
FIG. 7 is a perspective view of an end part of the lens unit.

As illustrated in FIGS. 6 and 7, the elongated lens 5 is positioned with respect to the bracket 21 in the Z direction by the plate springs 23 and 24 at both ends.

By attaching the plate spring 22 at the center part, the center part of the elongated lens 5 can inroad into the concave part 21a of the bracket 21.

A projection 21b extending downward is formed at both end parts of the bracket 21 and a positioning in the Z direction is performed by an abutting of the upper surface of the elongated lens 5 onto a lower end of the projection 21b by the biasing force of the plate springs 23 and 24.

Seen from the X direction in this state, the elongated lens 5 has a convex shape upward in the Z direction. This state is defined as an initial state.

Figure 8:
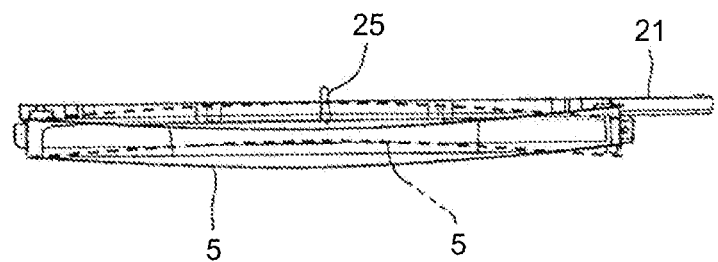
FIG. 8 illustrates a scanning line curvature adjustment in the lens unit.
Figure 9:
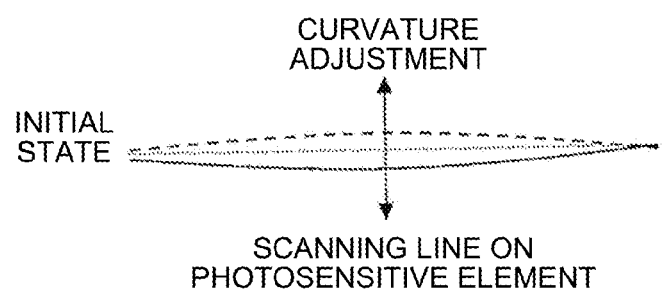
FIG. 9 illustrates a state of a scanning line on a photosensitive drum in the scanning line curvature adjustment.
Figure 10:
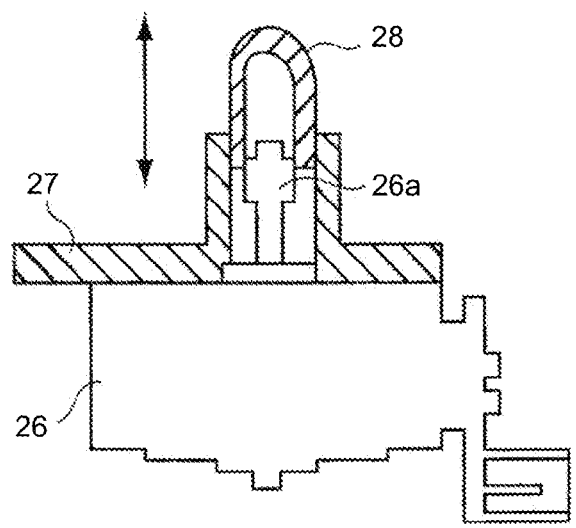
FIG. 10 is a schematic cross sectional view of a scanning line tilt adjusting unit.

Since a relation between a curvature shape in the Z direction of the elongated lens 5 and a shape of a scanning line on the photosensitive drum is approximately one to one, a curvature form of a scanning line on the photosensitive drum in the initial state of the lens becomes a state illustrated by a broken line in FIGS. 8 and 9.

Here, when a depression amount is made large by rotating the adjustment spring 25 provided at the center part of the bracket 21, the curvature state of the elongated lens 5 is changed from a convex shape to a concave shape illustrated by a solid line by way of a flat state in the Z direction and can be changed into an arbitrary shape.

Similarly, a curvature state of a scanning line on the photosensitive drum can be changed from a convex shape to a concave shape.

Since a variety of optical elements are mounted other than the elongated lens in an actual device as illustrated in FIG. 2, a convex shape and a concave shape which are curvature states of a scanning line on the photosensitive drum occur even in the case where the convex and concave states in the Z direction of the elongated lens are adjusted to be as flat as possible in a production stage.

As already explained, a color overlay in the state where the scanning line curvature has occurred causes a color deviation.

It becomes possible, by adjusting the amount of the convex and the concave of the elongated lens 5 by the adjustment spring 25 and setting the state of the scanning line curvature on the photosensitive drum to a flat state or to a convex/concave state of a reference color, to reduce the color deviation due to the scanning line curvature.

Next, the scanning line curvature adjustment will be explained.

The scanning line tilt adjusting unit 52 includes the driving motor 26, the motor holder 27, and the adjuster 28 to be in direct contact with the lower surface of the bracket 21.

A screw 26a, which engages with a screw hole formed in an inside of the adjuster 28, is formed in a rotating shaft of the driving motor 26.

A fitting part between the adjuster 28 and the motor holder 27 is, though not illustrated, configured to be vertically movable without a rotation of the adjuster 28.

A projection amount (displacement amount in the Z direction) of the adjuster 28 can be adjusted by the rotation amount of the driving motor 26.

The rotation of the driving motor 26 toward one direction causes a larger projection amount of the adjuster 28 and the rotation toward the reverse direction causes a smaller projection amount.

A tilt of a scanning line can be adjusted by making an attachment attitude of the elongated lens 5 inclined via the bracket 21 depending on the projection amount of the adjuster 28.

As explained already, the relation between the attitude of the elongated lens 5 and the state of a scanning line on the photosensitive drum is approximately one to one.

Figure 11A:
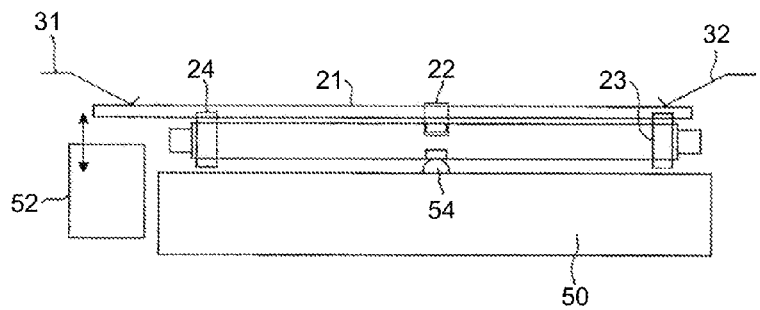
FIG. 11A is a front view of a structure for adjusting a scanning line tilt in the lens unit.
Figure 11B:
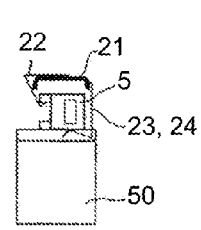
FIG. 11B is a side view of the structure for adjusting the scanning line tilt.

FIGS. 11A and 11B illustrate a state before the tilt of a scanning line is adjusted.

Figure 11C:
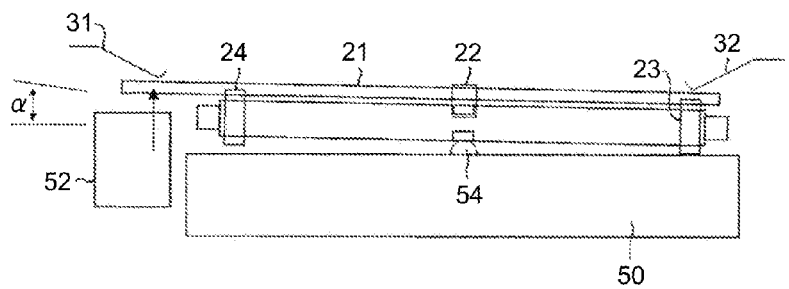
FIG. 11C illustrates an operation of adjusting a scanning line tilt by the scanning line tilt adjusting unit.
Figure 11D:
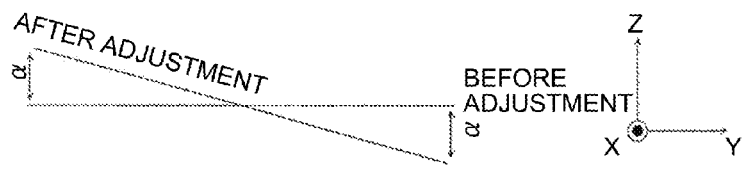
FIG. 11D illustrates tilts before and after the adjustment.

As illustrated in FIGS. 11C and 11D, when the scanning line tilt adjusting unit 52 is operated by a driving amount α, the scanning line is inclined, and an absolute amount on a sheet of paper and a relative amount with respect to a reference color can be adjusted both.

As explained above, the convex and concave states in the Z direction of the elongated lens 5 can be maintained by the bracket 21 and the plate springs 22 to 24.

Thus, it becomes possible to adjust a scanning line tilt while maintaining a scanning line curvature state, by adjusting the position in the Z direction at one side of the bracket 21 by the scanning line tilt adjusting unit 52.

In FIGS. 11A and 11C, a reference symbol 54 denotes a supporting convex part of a semicircle shape in a cross section formed on the optical element arranging surface 13b of the optical housing 50.

The elongated lens 5 is arranged in the optical housing in the state where its center part in the main-scanning direction is supported by the supporting convex part 54.

An integrated unit (hereinafter referred to as "lens unit") of the elongated lens 5 and the bracket 21 is capable of rotating in a plane including the Z direction based on a point of support of the supporting convex part 54.

Figure 19:
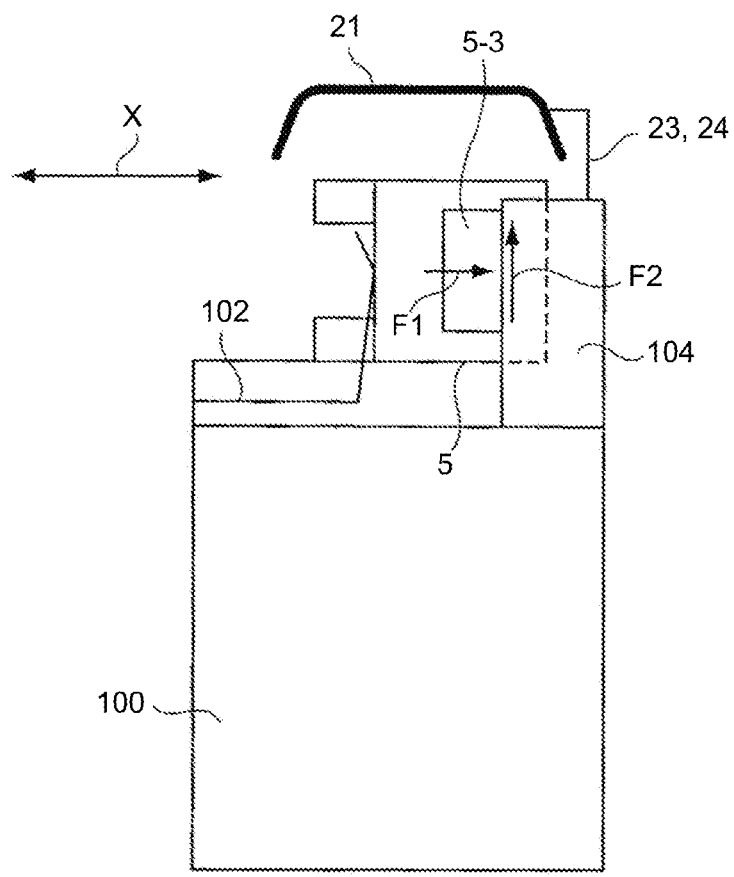
FIG. 19 is a side view for explaining a problem in the conventional technique.

Conventionally, a reference surface (positioning unit 104) is provided at a side of the optical housing and the elongated lens is depressed onto the surface for determining the position in the X direction as illustrated in FIG. 19.

Since a frictional force due to the pressurization of the plate spring 102 works with respect to a rotating direction in the adjustment of a scanning line tilt, it is therefore necessary to set a spring pressure so that plate springs 31 and 32 for tilt adjustment adequately exceed the frictional force.

In this regard, it becomes necessary to design the plate springs 31 and 32 so that the force of the plate spring 31 is larger at any time.

However, the pressure of the plate spring 32 surely becomes maximum (when the plate spring deforms at a maximum) in principle when the pressure of the plate spring 31 is minimum (when the projection amount of the adjuster of the scanning line tilt adjusting unit is minimum, i.e, when the plate spring deforms at a minimum) in this configuration.

Therefore, a selection of a strong spring pressure without careful consideration would cause a mechanical failure.

Figure 12:
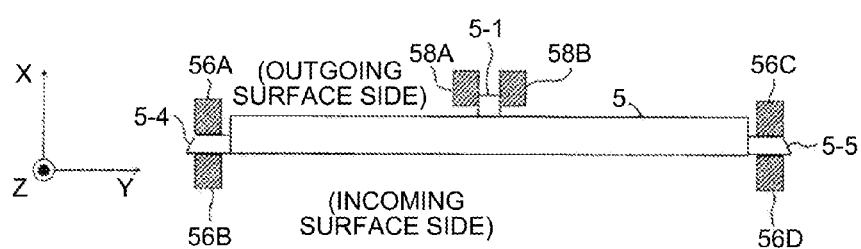
FIG. 12 is a plan view of an optical axis direction positioning unit.
Figure 13:
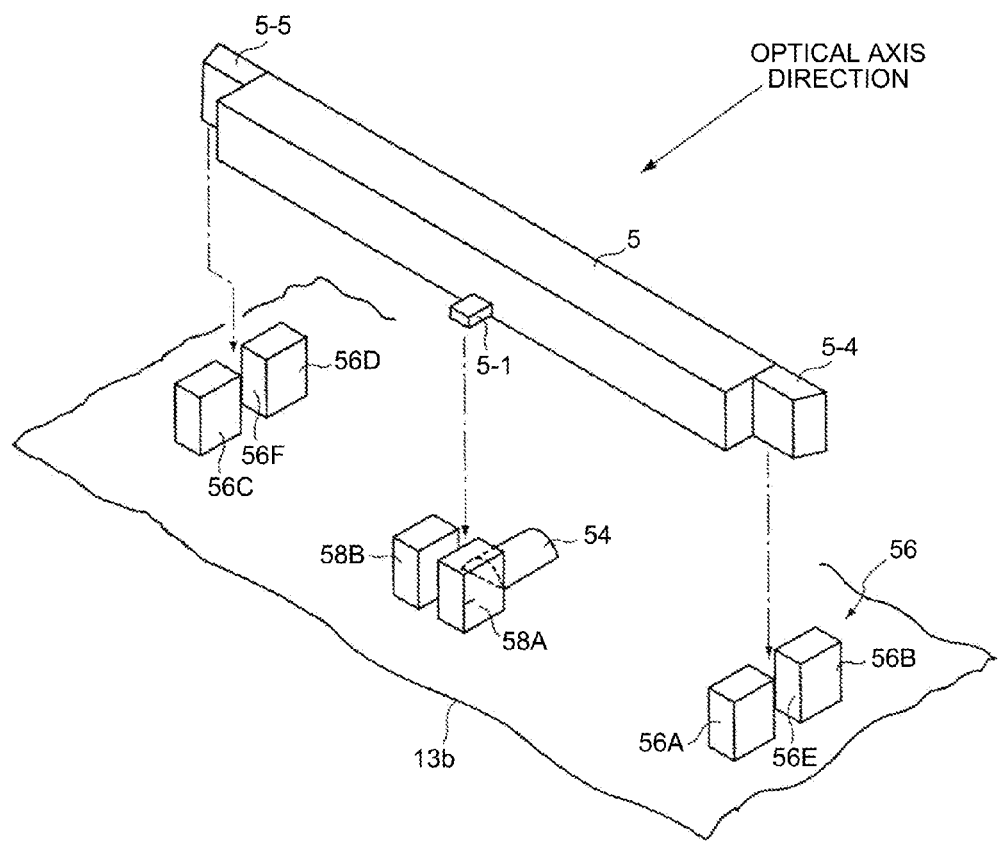
FIG. 13 is a perspective view of the optical axis direction positioning unit.

The present embodiment is configured to position the elongated lens 5 in the optical axis direction by fitting the elongated lens 5 in an optical axis direction positioning unit 56 that is formed in the optical housing and includes convex/concave fitting shapes, as illustrated in FIGS. 12 and 13.

In FIGS. 12 and 13, the bracket, the plate spring, and the like are omitted (the same applies hereinafter to the other figures).

The optical axis direction positioning unit 56 includes receiving parts 56A and 56B which each have a block-like shape and are arranged on the optical element arranging surface 13b for one end side in the main-scanning direction of the elongated lens 5, and receiving parts 56C and 56D which each have a block-like shape and are arranged for the other end side.

At a part, corresponding to the center part of the elongated lens 5, on the optical element arranging surface 13b, positioning parts 58A and 58B that position the convex part 5-1 in the main-scanning direction are formed.

At both end parts in the main-scanning direction of the elongated lens 5, fitting convex parts 5-4 and 5-5 whose thickness in the optical axis direction is made small are formed.

A gap between the receiving parts 56A and 56B serves as a fitting concave part 56E in which the fitting convex part 5-4 is set, and a gap between the receiving parts 56C and 56D serves as a fitting concave part 56F in which the fitting convex part 5-5 is set.

Here, inner side corner parts on top surfaces of the receiving parts 56A and 56B and the receiving parts 56C and 56D may be chamfered to enable a smooth fitting operation.

With the configuration in which the elongated lens 5 is fit in the optical axis direction positioning unit 56 formed at the side of the optical housing and positioned in the optical axis direction, it is not necessary to arrange the plate spring 102 that provides pressure toward the optical axis direction like the configuration disclosed in Japanese Patent No. 4951242.

The adjustment of the scanning line tilt is not disturbed due to the pressure force F1 by the plate spring 102, thereby enabling an easy adjustment of the scanning line tilt.

Figure 14:
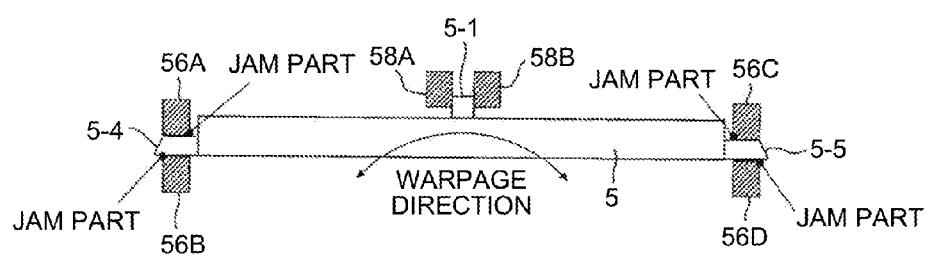
FIG. 14 is a plan view of a fit condition of the elongated lens with respect to the optical axis direction positioning unit.

As illustrated in FIG. 14, when the elongated lens 5 is made of resin, a curvature toward the optical axis direction occurs due to a warpage in molding and an impact in an assembly to the bracket 21.

The warpage amount occurring on this occasion is mostly larger, by one digit, than an amount of a clearance for positioning the elongated lens 5 by fitting.

When the warpage is large, the elongated lens 5 is fit into the clearance for fitting, jam parts arise at four locations at the incoming surface side and the outgoing surface side of the elongated lens, so that a large frictional force occurs with respective receiving surfaces of the receiving parts 56A, 56B, 56C, and 56D.

In this case, there is a possibility of causing a problem in the rotating operation of the lens unit in the scanning line tilt adjustment.

Figure 15:
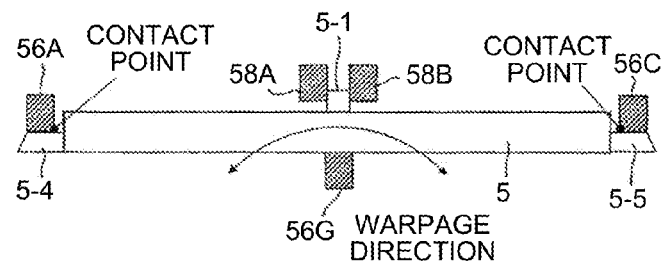
FIG. 15 is a plan view for explaining a problem when the elongated lens has a warpage.

In the present embodiment, the receiving parts, for the positioning by fitting, on the optical housing side are arranged only at the center part of the elongated lens at the incoming surface side, and at both end parts at the outgoing surface side as illustrated in FIG. 15.

Specifically, the receiving parts 56A and 56C are arranged as a receiving part that regulates one surface at the same side in the optical axis direction of the elongated lens 5, and a receiving part 56G is arranged as a receiving part that regulates the other one surface at the opposite side at the center part in the main-scanning direction.

In this case, a space zoned by the receiving parts 56A, 56C, and 56G serves as a fitting concave part.

With this configuration, it is possible to position the elongated lens 5 in the main-scanning direction and also reduce, to two surfaces, surfaces on which a friction that affects the rotating operation of the lens unit in the scanning line tilt adjustment occurs.

Thus, it becomes possible to keep a stable adjustment precision. Here, the receiving parts may be arranged reversely.

More specifically, the receiving parts may be arranged at both end parts at the incoming surface side and arranged at the center part at the outgoing surface side.

Second Embodiment

A second embodiment will be explained with reference to FIGS. 16 and 17.

The same part as the first embodiment will be assigned with the same reference symbol, a structural and functional explanation already made will be omitted unless specifically required, and only a relevant part will be explained (the same applies hereinafter to the other embodiment below).

In the first embodiment, the fitting convex parts of the elongated lens 5 are configured to be in surface contact with the receiving parts and the occurrence of friction that affects the rotating operation of the lens unit is limited to two surfaces to reduce a frictional force.

The second embodiment is configured to further reduce the frictional force in the rotating operation without changing the configuration of the arrangement of the receiving parts 56A, 56C, and 56G in the first embodiment.

Figure 16A:
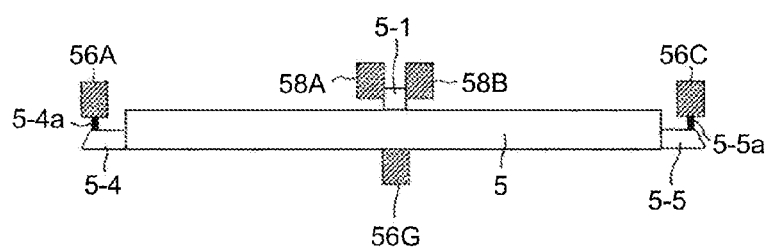
FIG. 16A is a plan view of a configuration of an optical axis direction positioning unit according to a second embodiment.

As illustrated in FIG. 16A, ribs 5-4a and 5-5a which have a small thickness in the main-scanning direction and project in the optical axis direction are formed respectively in the fitting convex parts 5-4 and 5-5 at both end parts of the elongated lens 5.

By a direct contact with the receiving parts 56A and 56C via the ribs 5-4a and 5-5a whose contact area is small, the frictional force in the rotating operation of the lens unit is reduced.

Figure 16B:
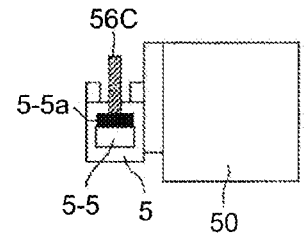
FIG. 16B is a side view of the configuration of an optical axis direction positioning unit according to the second embodiment.

In the present embodiment, the receiving parts 56A and 56C are configured to have a thin plate rib shape similarly to the ribs 5-4a and 5-5a, and be arranged to be perpendicular, as illustrated in FIG. 16B.

In other words, the receiving parts 56A and 56C are made in direct contact in a manner of intersecting in a cross shape.

This configuration allows a contact with members whose area is small and thereby enables more reduction of the frictional force in the rotating operation of the lens unit.

At least one of the receiving parts 56A and 56C and the fitting convex parts 5-4 and 5-5 may be the rib shape whose area is small.

In FIG. 16B, rise parts of the receiving parts 56A and 56C from the optical element arranging surface 13b are omitted.

Third Embodiment

A third embodiment will be explained with reference to FIGS. 17 and 18.

Figure 17A:
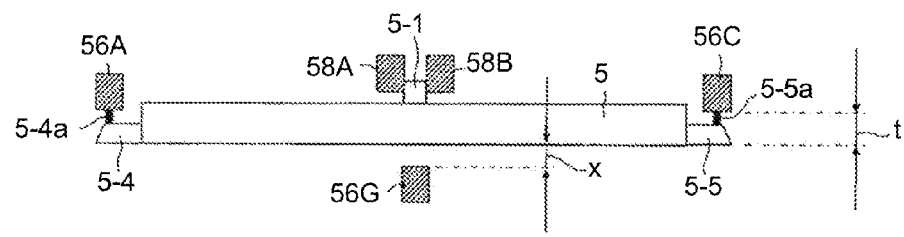
FIGS. 17A and 17B illustrate a problem when a clearance at a side of the optical axis direction positioning unit is large.

In positioning by fitting, it is assumed to surely have a clearance (room that enables fitting) x as illustrated in FIG. 17A.

Figure 17B:
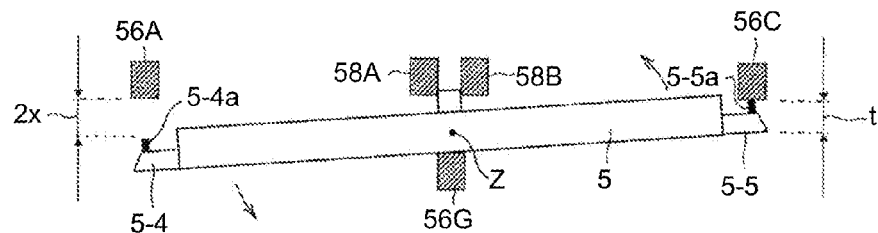

Therefore, a configuration would allow a rotation on the axis of the Z direction depending on a degree of the clearance as illustrated in FIG. 17B.

Since the elongated lens 5 has a curvature factor that condenses a light to the Z direction, it is necessary to make a positional variation to the X direction in an image forming apparatus in which higher precision is demanded though the position variation in the X direction has little impact.

The present embodiment is configured to specify conditions by which the positional variation in the X direction is suppressed as much as possible.

Figure 18:
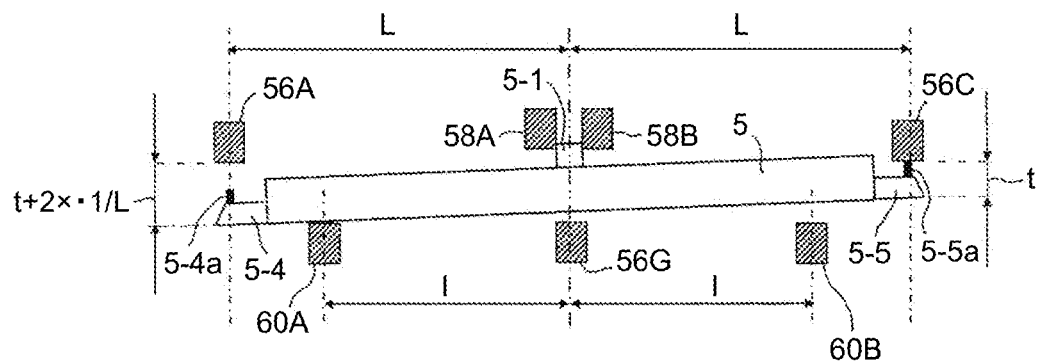
FIG. 18 is a plan view of a configuration of an optical axis direction positioning unit according to third embodiment.

The configuration is illustrated in FIG. 18.

In the present embodiment, auxiliary receiving parts 60A and 60B are arranged at the same side as the receiving part 56G arranged at the center part.

With this configuration, even in the case of the rotation on the axis in the Z direction, it becomes possible by satisfying conditions below to keep good characteristics with no excessive rotation.

Conditions

Assuming that a distance between a receiving surface of the receiving parts 56A and 56C for both end parts in the main-scanning direction of the elongated lens 5 and a receiving surface of the auxiliary receiving parts 60A and 60B is "Y", a thickness in the optical axis direction of the elongated lens 5 is "t", the clearance which is provided in the optical axis direction positioning unit 56 to enable the elongated lens 5 to be fitted is "x", a distance from the center in the main-scanning direction of the elongated lens 5 to the auxiliary receiving parts 60A and 60B is "l", and a distance from the center in the main-scanning direction of the elongated lens 5 to the receiving parts 56A and 56C is "L", $$t+x < Y < t+2x \cdot l/L$$

is satisfied.

In the method of fitting the elongated lens 5 according to the first and the second embodiments, it is inevitable to cause a subtle slip with respect to the optical housing.

With the configuration satisfying the conditions above, it is possible to smoothly perform the rotating operation of the lens unit in the scanning line tilt adjustment and also reduce a slip due to the rotation on the axis of the Z direction.

According to the embodiments, it is possible to secure enough room for adjustment in range in adjustment of curvature of a scanning line, suppress variation in adjustment precision, and contribute to a reduction in cost as a result of a reduction in the number of components to be mounted.

According to the embodiments, it is also possible to secure robustness in adjustment precision against variation in precision in mass produced components.

The optical scanning device according to each embodiment described above, which forms an electrostatic latent image based on image information, may be applied to an image forming apparatus such as a copying machine, a printer, a facsimile, a plotter which are provided with the optical scanning device, and a multi-function machine provided with at least one of the copying machine, the printer, the facsimile, and the plotter.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
   an optical housing;
   an elongated optical element arranged in the optical housing, the elongated optical element having a first surface and a second surface extending in a main-scanning direction;
   a retaining member provided at a side opposite to a surface of the optical housing on which the elongated optical element is arranged, the retaining member being configured to maintain an attachment attitude of the elongated optical element in the optical housing;
   a scanning line curvature adjusting unit configured to adjust a curvature of the elongated optical element in a scanning line via the retaining member;
   a scanning line tilt adjusting unit configured to adjust a tilt of the elongated optical element in the scanning line by making the elongated optical element rotate on an axis of an optical axis direction via the retaining member; and
   an optical axis direction positioning unit configured to position the elongated optical element in the optical axis direction such that, when the elongated optical element is installed in the optical axis direction positioning unit, the optical axis direction positioning unit regulates the elongated optical element by applying pressure to end parts of the first surface such that pressure is not applied to the end parts the second surface of the elongated optical element, the optical axis direction positioning unit including,
      first receiving parts configured to regulate the end parts of the first surface of the elongated optical element in the main-scanning direction,
      a second receiving part configured to regulate a center part of the second surface of the elongated optical element in the main-scanning direction, and third receiving parts provided as auxiliary receiving parts in the optical housing, the third receiving parts configured to regulate parts of the elongated optical element at the second surface between the center part of the elongated optical element and the respective end parts of the elongated optical element in the main-scanning direction, wherein $t+x<Y<t+2x \cdot l/L$ is satisfied, where Y represents a distance in the optical axis direction between a receiving surface of the first receiving parts and a receiving surface of the third receiving parts, t represents a thickness in the optical axis direction of the elongated optical element, x represents a clearance between the optical axis direction positioning unit and the elongated optical element to enable the elongated optical element to be fitted, l represents a distance from the center of the elongated optical element in the main-scanning direction to the third receiving parts, and L represents a distance from the center of the elongated optical element in the main-scanning direction to the first receiving parts.

2. The optical scanning device according to claim 1, wherein parts of the elongated optical element to be in contact with the first receiving parts and at least one of the first receiving parts are each formed in a rib shape to have a reduced contact area.

3. The optical scanning device according to claim 2, wherein each of the parts of the elongated optical element to be in contact with the first receiving parts and each of the first receiving parts are both formed in a rib shape to be in contact with each other in an orthogonally-crossed manner.

4. An image forming apparatus, comprising the optical scanning device according to claim 1.

5. An optical scanning device, comprising:
an optical housing;
an elongated optical element arranged in the optical housing, the elongated optical element having a first surface and a second surface extending in a main-scanning direction;
a retaining member provided at a side opposite to a surface of the optical housing on which the elongated optical element is arranged, the retaining member being configured to maintain an attachment attitude of the elongated optical element in the optical housing;
a scanning line curvature adjusting unit configured to adjust a curvature of the elongated optical element in a scanning line via the retaining member;
a scanning line tilt adjusting unit configured to adjust a tilt of the elongated optical element in the scanning line by making the elongated optical element rotate on an axis of an optical axis direction via the retaining member; and
an optical axis direction positioning unit configured to position the elongated optical element in the optical axis direction such that, when the elongated optical element is installed in the optical axis direction positioning unit, the optical axis direction positioning unit regulates the elongated optical element by applying pressure to end parts of the first surface such that pressure is not applied to the end parts the second surface of the elongated optical element, the optical axis direction positioning unit including,
first receiving parts configured to regulate the end parts of the first surface of the elongated optical element in the main-scanning direction,
second receiving part configured to regulate a center part of the second surface of the elongated optical element in the main-scanning direction, and
third receiving parts provided as auxiliary receiving parts in the optical housing, the third receiving parts configured to regulate parts of the elongated optical element at the second surface between the center part of the elongated optical element and the respective end parts of the elongated optical element in the main-scanning direction, wherein $t+x<Y<t+2x \cdot l/L$ is satisfied, where Y represents a distance in the optical axis direction between a receiving surface of the first receiving parts and a receiving surface of the third receiving parts, t represents a thickness in the optical axis direction of the elongated optical element, x represents a clearance between the optical axis direction positioning unit and the elongated optical element to enable the elongated optical element to be fitted, l represents a distance from the center of the elongated optical element in the main-scanning direction to the third receiving parts, and L represents a distance from the center of the elongated optical element in the main-scanning direction to the first receiving parts.

* * * * *